(12) United States Patent
Blackmon et al.

(10) Patent No.: US 6,703,460 B1
(45) Date of Patent: Mar. 9, 2004

(54) USE OF SEQUENTIAL POLYPEROXIDES TO PRODUCE POLYSTYRENE WITH HIGH GRAFTING

(75) Inventors: Kenneth Paul Blackmon, Houston, TX (US); Lu Ann Kelly, Friendswood, TX (US)

(73) Assignee: Fina Technology, Inc., Houston, TX (US)

( * ) Notice: Subject to any disclaimer, the term of this patent is extended or adjusted under 35 U.S.C. 154(b) by 0 days.

(21) Appl. No.: 10/379,068

(22) Filed: Mar. 4, 2003

(51) Int. Cl.[7] .......................... C08F 4/36; C08F 279/02
(52) U.S. Cl. .................. 526/232.2; 526/228; 526/230; 526/346; 526/347.2; 525/263; 525/273; 525/316
(58) Field of Search ................. 526/228, 230, 526/232.3, 346, 347.2; 525/263, 273, 316

(56) References Cited

U.S. PATENT DOCUMENTS

| | | | |
|---|---|---|---|
| 4,469,862 A | * | 9/1984 | Komai et al. ............... 528/271 |
| 4,777,210 A | | 10/1988 | Sosa et al. |
| 5,115,055 A | | 5/1992 | Dais et al. |
| 5,258,465 A | * | 11/1993 | Suyama et al. ............. 525/263 |
| 5,719,243 A | | 2/1998 | Alferink et al. |
| 5,760,149 A | * | 6/1998 | Sanchez et al. ........... 526/230.5 |

OTHER PUBLICATIONS

B. R. Dean, "Graft Copolymers from Peroxidized EPDM Rubber," Journal of Applied Polymer Science, 1986, pp. 5619–5625, vol. 32, John Wiley & Sons, Inc.

A. Echte, "Rubber–Toughened Styrene Polymers," Rubber-Toughened Plastics, 1989, pp. 15–63, American Chemical Society.

"The Right Catalyst for the Right Job (for the Polyester Industry)," 2000, Atofina Chemicals, Inc., Philadelphia, PA.

W. Arayapranee, et al., "Synthesis of Graft Copolymers from Natural Rubber Using Cumene Hydroperoxide Redox Initiator," Journal of Applied Polymer Science, 2002, pp. 2993–3001, vol. 83, John Wiley & Sons, Inc.

* cited by examiner

*Primary Examiner*—Fred Teskin
(74) *Attorney, Agent, or Firm*—Madan, Mossman & Sriram, P.C.; Bradley A. Misley

(57) ABSTRACT

It has been discovered that sequential polyperoxides can be beneficially used as initiators for vinylaromatic/diene copolymers to give high grafting values and reasonable molecular weights. A new cyclic diperoxide did not give these same results. The sequential polyperoxide initiators can be used as the only initiators or together with other conventional peroxide initiators to advantage. The polymerization rate can also be increased using these sequential polyperoxide initiators.

33 Claims, 4 Drawing Sheets

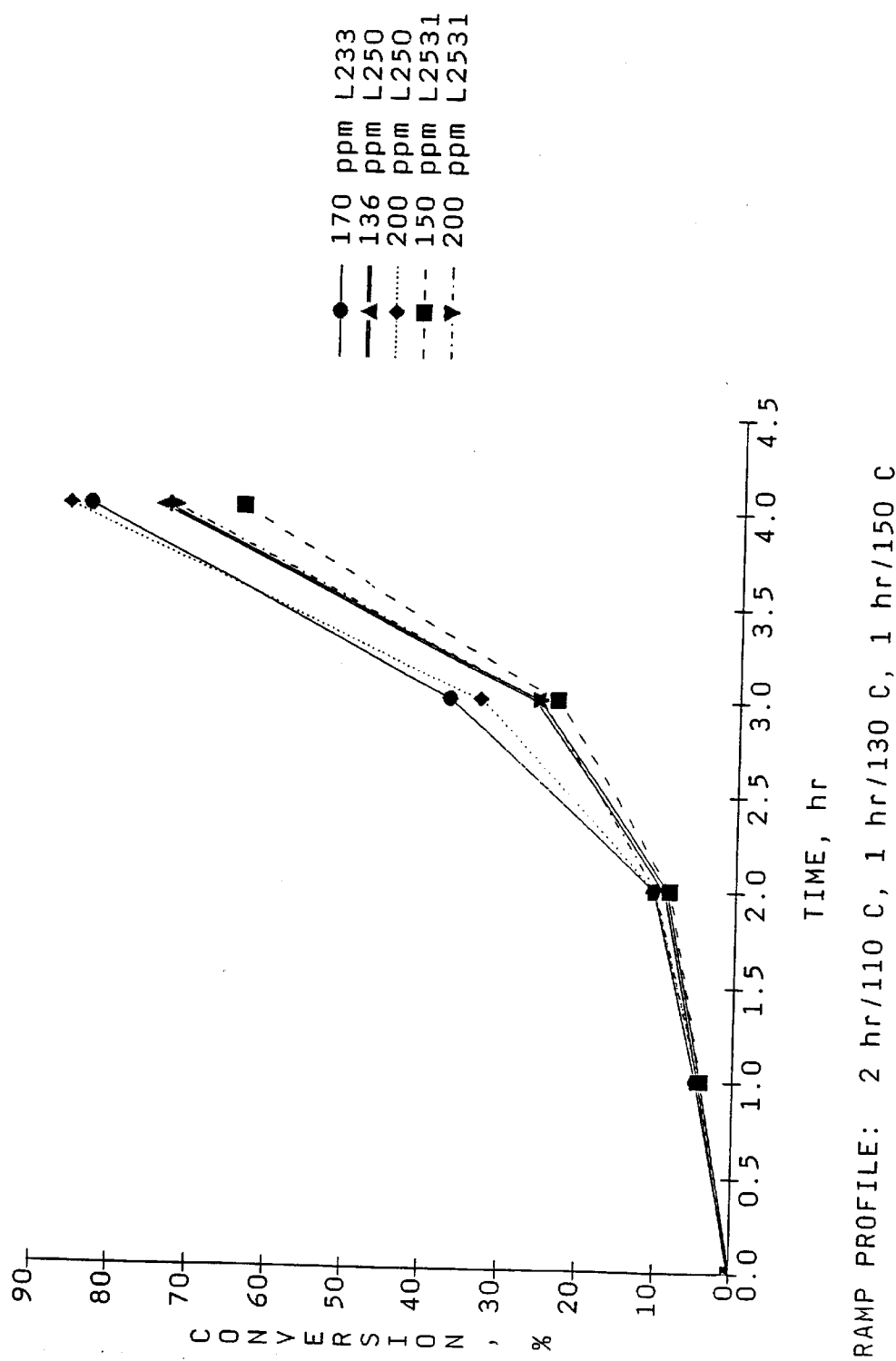

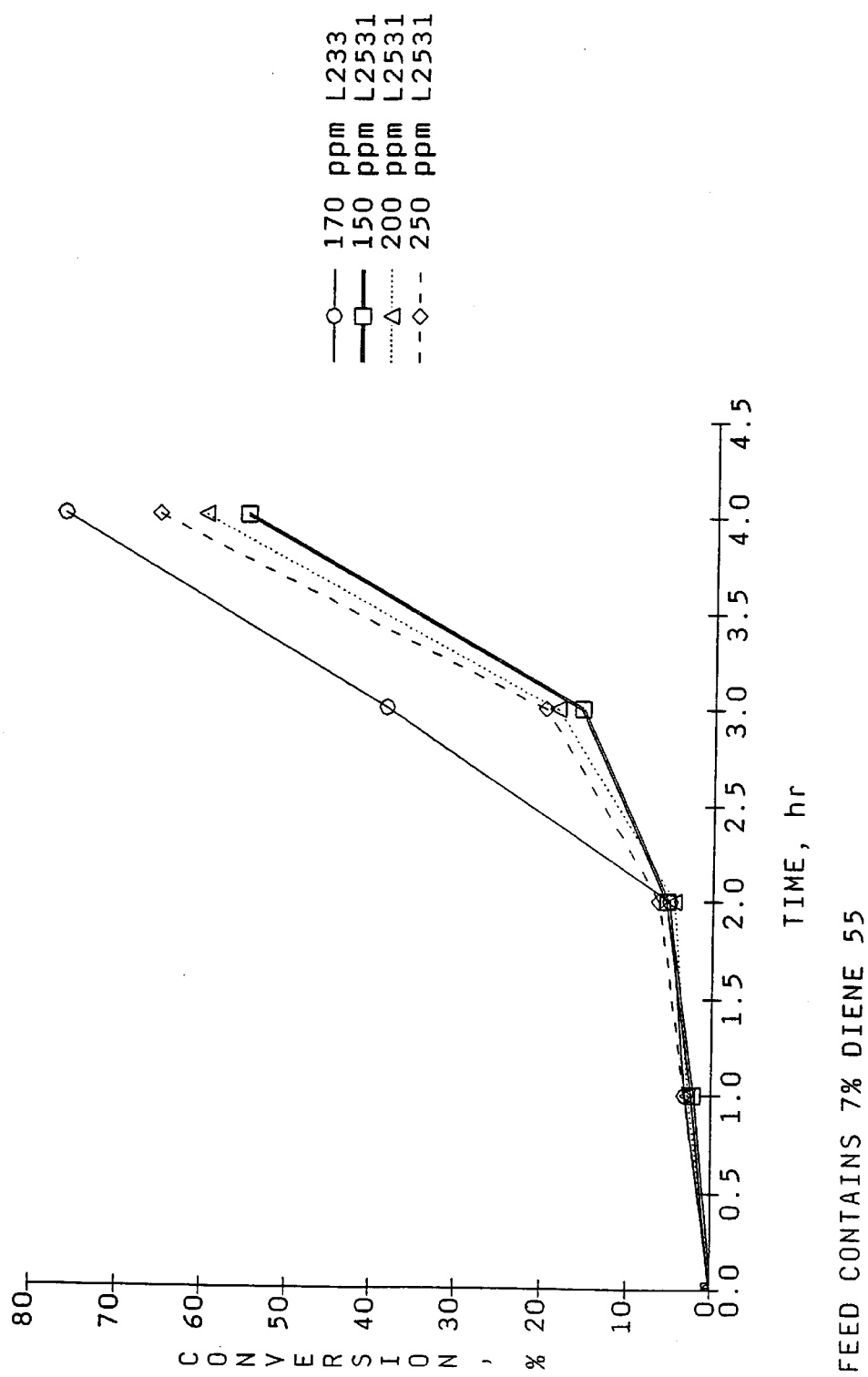

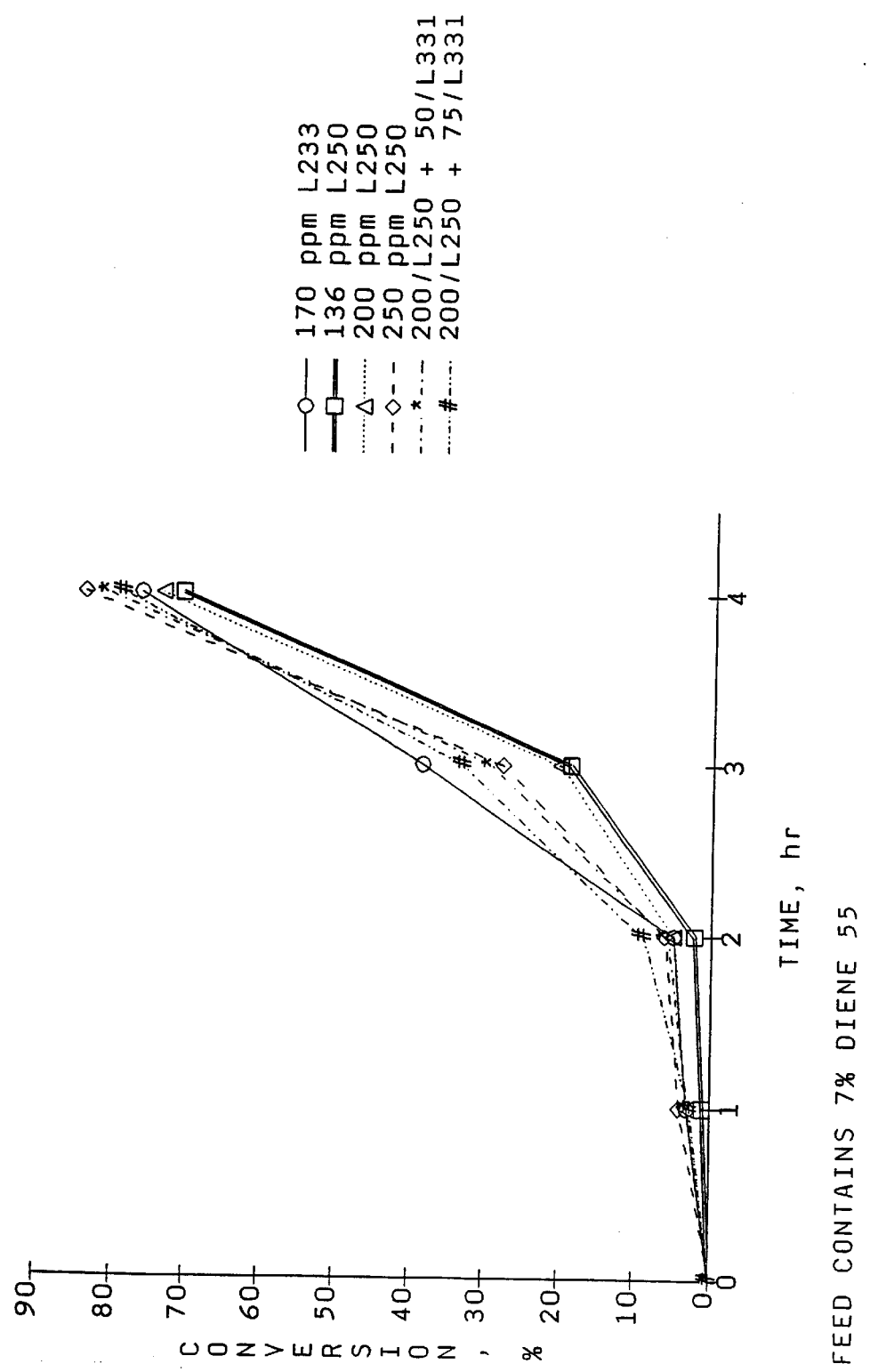

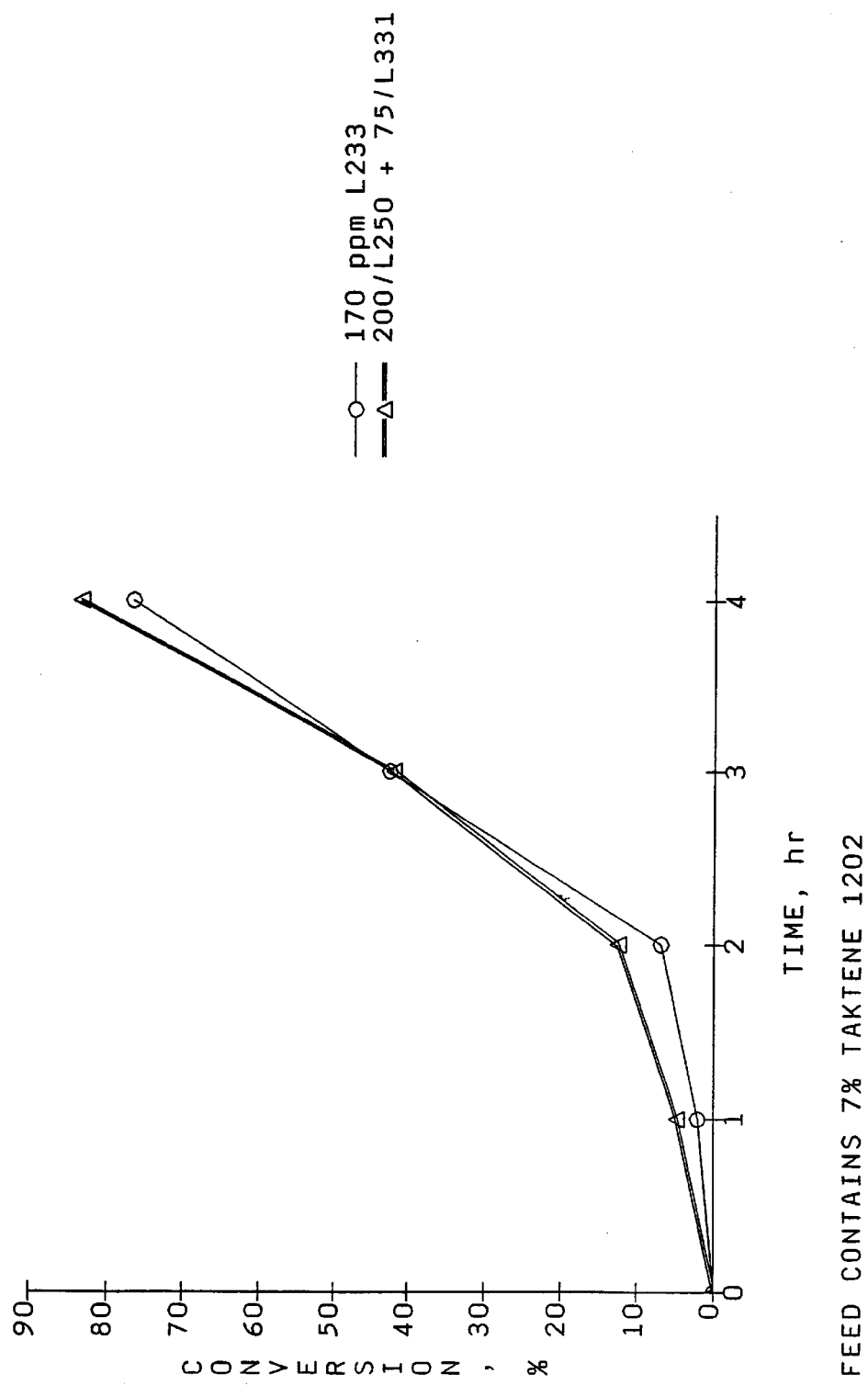

USE OF SEQUENTIAL POLYPEROXIDES TO PRODUCE POLYSTYRENE WITH HIGH GRAFTING

FIELD OF THE INVENTION

The present invention is related to methods and compositions useful to improve the polymerization rate and molecular weight of polystyrene, and more particularly relates to methods and compositions useful to improve the polymerization rate, molecular weight, and rubber phase properties of high impact polystyrene.

BACKGROUND OF THE INVENTION

High impact polystyrene (HIPS) is an example of graft polymer formation between polystyrene and polybutadiene (rubber). A wide variety of peroxy compounds is known from the literature as initiators for the production of styrenic polymers. Commercially available initiators for polymer production may be classified in different chemical groups, which include diacylperoxides, peroxydicarbonates, dialkylperoxides, peroxyesters, peroxyketals, and hydroperoxides. Certainly, there are ongoing efforts within the industry to improve the polymerization rates of styrenic monomers, polymer molecular weights/molecular weight distributions, and to improve the rubber phase properties (i.e. rubber particle size, increase grafting, % gel, swell index) of HIPS. Attaining these improvements would allow for enhanced production economics and resin physical properties (e.g. improved stiffness/impact strength balance).

Peroxides and hydroperoxides undergo at least four reactions in the presence of monomers or hydrocarbons with double bonds. These reactions are: 1) chain transfer, 2) addition to monomer, 3) hydrogen abstraction, and 4) recombination, often called a cage effect.

Hydroperoxides have been shown to undergo induced decomposition reactions, in which a polymer radical (~~P*) will react with the initiator as shown below. This reaction is basically a chain transfer reaction and the reaction should be amenable to the well-known chain transfer equations. Radicals obtained from peroxide initiators (RCOO*) can also abstract a hydrogen from the hydroperoxide.

RCOO* or ~~P*+RCOOH→~~PH+ROO*

Baysal and Tobolsky (*Journal of Polymer Science*, Vol. 8, p. 529 et seq., (1952), incorporated by reference herein) investigated the chain transfer of polystyryl radicals to t-butylhydroperoxide (t-BHP), cumyl hydroperoxide (CHP), benzoyl peroxide ($Bz_2O_2$), and azobisisobutyronitrile (AIBN). AIBN and benzoyl peroxide give the classical linear correlations between rate and 1/DP (Degree of Polymerization) indicating no chain transfer to initiators. The hydroperoxides, however, show significant levels of chain transfer.

A. I. Lowell and J. R. Price (*Journal of Polymer Science*, Vol. 43, p. 1, et seq. (1960), incorporated by reference herein) also showed that polystyryl radicals undergo considerable chain transfer with bis(2,4-dichloro) benzoyl peroxide as compared to dilauroyl peroxide.

The transition metal catalyzed peroxidation of the pendant allylic functionality in ethylene-propylene-diene monomer (EPDM) rubbers with tertiary butyl hydroperoxide results in elastomeric, high polymer peroxides, according to B. Dean in "Graft Copolymers from Peroxidized EPDM Rubber," *Journal of Applied Polymer Science*, Vol. 32, pp. 5619–5625 (1986), incorporated by reference herein. The peroxidized EPDM rubbers are useful as free radical initiators for the polymerization and grafting of vinyl monomers in the preparation of comb-type structures. The grafted EPDM rubbers are efficient impact modifiers for thermoplastic resins so long as the polymer grafted onto the EPDM is identical to or is thermodynamically miscible with the composition of the thermoplastic resin.

It would be desirable if methods could be devised or discovered to accelerate the polymerization rate of HIPS, and/or increase the grafting that occurs during this polymerization, as well as to improve other properties of HIPS.

SUMMARY OF THE INVENTION

There is provided, in one form, a method for polymerizing at least one vinylaromatic monomer in the presence of a sequential polyperoxide initiator, and then (b) recovering a polymerized product.

In another embodiment of the invention, there are provided monomer compositions that include sequential polyperoxide initiator, and polymerized products made by the method described above.

BRIEF DESCRIPTION OF THE DRAWINGS

FIG. 1 is a graph of the % conversion of styrene to polystyrene as a function of time using LUPERSOL 233 as a baseline, and LUPERSOL 250 and LUPERSOL 2531 initiators;

FIG. 2 is a graph of the % conversion of styrene to polystyrene in the preparation of HIPS as a function of time using LUPERSOL 233 as a baseline and LUPERSOL 2531 initiators;

FIG. 3 is a graph of the % conversion of styrene to polystyrene in the preparation of HIPS as a function of time using LUPERSOL 233 as a baseline, and LUPERSOL 250, alone and together with LUPERSOL 331 initiator; and FIG. 4 is a graph of the % conversion of styrene to polystyrene in the preparation of HIPS as a function of time using LUPERSOL 233 as a baseline and LUPERSOL 250 together with LUPERSOL 331 initiator.

DETAILED DESCRIPTION OF THE INVENTION

The composition of the invention involves a polydiene-modified monovinyl aromatic polymer, in another non-limiting embodiment a rubber (polybutadiene)-modified polystyrene. An alternative non-limiting embodiment of the invention includes polystyrene that has not been rubber modified, since an optimization of the initiator according to this invention may give increased polymerization rates. Styrene monomer is desirably polymerized in the presence of from about 2 to about 15 weight percent rubber to produce a polymer having impact resistance superior to that of polystyrene homopolymer, in one non-limiting embodiment. A preferred rubber for use in making the subject compositions is polybutadiene. The resultant thermoplastic composition, when made with these materials, is high impact polystyrene, or HIPS. The predominant morphology of the polymer of the invention is cell or "salami" with some core-shell, meaning that the continuous phase of polystyrene comprises a plurality of dispersed structures in which polystyrene is trapped within rubber particles having a distinct membrane and small quantities of polystyrene are occluded inside single cell polybutadiene shells grafted to the aromatic polymer.

It is known that the degree of chemical grafting of polystyrene onto polybutadiene will influence the final HIPS properties, e.g. rubber particle size, impact strength and elongation. In general, high grafting values are desirable and indicate the extent to which the rubber particles are adhered to the polystyrene matrix.

In conducting laboratory studies on developmental initiators, an objective was to assess the effects of initiator type and concentration on polymerization rate, polymer molecular weight, and rubber phase properties (i.e., rubber particle size, grafting, % gel, and swell index). It was discovered that sequential polyperoxide initiators yielded HIPS materials at desirable rates with reasonable molecular weights and high grafting values.

Styrene polymerization processes are well known. The compositions of the invention can be made by batch polymerization in the presence of from about 2 to 15, and most preferably from about 4 to about 12, weight percent polybutadiene using conventional initiators at concentrations of from about 100 to about 800 ppm (based on weight of feed) and using a solvent. Here the solvent is the diluent for the reaction, which may be any conventional solvent, such as ethylbenzene, xylenes, etc. Conventional hydroperoxide and peroxycarboxylate initiators useful together with the inventive sequential polyperoxide initiators include peroxide initiators having a half-life of one-half to one hour at 110–130° C., including, but not necessarily limited to, 1,1-di-(t-butylperoxy)cyclohexane (LUPERSOL® 331 catalyst or L-331 available from ATOFINA Chemicals, Inc.); 1,1-di-(t-amylperoxy)-cyclohexane (LUPERSOL® 531 catalyst or L-531 available from ATOFINA Chemicals, Inc.); t-amyl peroxy -2-ethylhexyl carbonate (TAEC), t-butylperoxy isopropyl carbonate (TBIC), ethyl-3,3-di(t-butylperoxy) butyrate; t-butyl perbenzoate; 1,1 -di-(t-butylperoxy)-3,3,5-trimethyl-cyclohexane (LUPERSOL® 231 catalyst or L-231 available from ATOFINA Chemicals, Inc.); ethyl-3,3-di-(t-butylperoxy)-butyrate) (LUPERSOL® 233 catalyst or L-233 available from ATOFINA Chemicals, Inc.); ethyl-3, 3-di(t-amylperoxy)butyrate (LUPERSOL 533) and combinations thereof. In contrast to these conventional peroxide initiators and others examined, it was surprisingly discovered that sequential polyperoxide initiators (i.e., a molecule containing different types of peroxide moieties which could decompose "sequentially" as a function of polymerization temperature) give HIPS with relatively high grafting values (200–240% as compared with 150–170% obtained with conventional initiators for medium-cis rubber and 180% for high cis-rubber materials as compared with 130–140% grafting for conventional initiators). In one non-limiting embodiment of the invention, the sequential polyperoxide initiator has the structure:

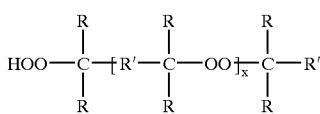

(I)

where R is the same or different, linear or branched $C_1$–$C_4$ alkyl, R' is the same or different, linear or branched $C_1$–$C_4$ alkylene, and x ranges from 1 to 4. In one non-limiting embodiment of the invention, the sequential polyperoxide initiator is a diperoxide and x is 1. These sequential diperoxides are distinguished by having one hydroperoxy group HOO— and at least one internal peroxy group. Representative examples of suitable sequential polyperoxide initiators include, but are not necessarily limited to, 2,5-dimethyl-2-t-butylperoxy-5-hydroperoxyhexane (LUPERSOL 250); HOO—C($CH_3$)($C_2H_5$)—OO—C($CH_3$)($C_2H_5$)—OOH (contained in LUPERSOL DDM), and combinations thereof.

In one non-limiting embodiment of the invention, the sequential polyperoxide initiator is used in an amount ranging from about 50 to about 800 ppm, based on the vinylaromatic monomer feed, alternatively from about 100 to about 500 ppm. The sequential polyperoxide initiator may be used alone or in combination with other conventional initiators as desired in order to optimize the polymerization rates in the various stages of the process, as well as the properties of the final styrenic polymers. In one non-limiting embodiment of the invention, the weight ratio of sequential polyperoxide initiator to conventional initiator ranges from about 100 to 0 to about 10 to 0.1. In another non-limiting embodiment of the invention, this weight ratio ranges from about 5 to 0.5 to about 3 to 1.

The selection of the proper peroxide(s) for a given polymerization process is a critical factor in attaining desirable performance and properties. The utility of an initiator in the styrene polymerization process depends upon the temperature profile, which dictates the rate at which the peroxide(s) will decompose. Further considerations are the types of radical species, e.g., methyl, ethyl, t-butoxy, hydroxy, and their functionalities, i.e., mono-di- or tetra-radicals, which are generated upon decomposition.

The subject invention resulted from a study to evaluate two initiators from ATOFINA Chemicals, Inc. The sequential polyperoxide initiator was 2,5-dimethyl-2-t-butylperoxy-5-hydroperoxyhexane (LUPERSOL 250), that has the structure of formula (I) where R is methyl in each instance, R' is ethylene, and x is 1. The other initiator investigated was 9,9,12,12-tetramethyl-7,8,13, 14-tetraoxaspiro-[5.8]tetradecane (LUPERSOL 2531), which has the structure:

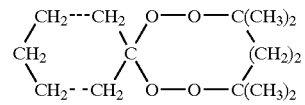

Suitable solvents for the initiators include, but are not necessarily limited to, hexane, cyclohexane, and toluene. In one non-limiting embodiment of the invention, the polymerization is conducted at a temperature between about 100° C. and about 180° C., or in an alternative non-limiting embodiment of the invention at a temperature between about 80 and about 180° C.

Grafting of polystyrene occurs by using polybutadiene having a medium or high-cis isomer content, with a medium-cis polybutadiene content being used in one non-limiting embodiment. Polybutadiene useful in making the composition of the invention is produced, for example, by known processes by polymerizing butadiene in either a hexane or cyclohexane solvent to a concentration of about 12 weight percent, and flashing off the solvent at a temperature ranging from about 80° to 100° C. to further concentrate the polybutadiene solution to about 24 to 26 weight percent, the approximate consistency of rubber cement. The crumb polybutadiene is then precipitated from the solution using steam, then dried and baled. Commercially available rubbers suitable for producing HIPS are available from several suppliers such as Bayer 380, 550, and 710 (Bayer Corporation, Orange, Tex.) and Firestone Diene 35, 55, and 70 (Firestone Polymers, Akron, Ohio). In one non-limiting embodiment of the invention, the weight ratio of vinylaromatic monomer to diene polymer or diene copolymer ranges from about 97:3 to about 85:15

It will be appreciated that more than one peroxide initiator may be used within the context of this invention. It is expected that accelerators can be used together with the sequential polyperoxide initiators of this to accelerate the decomposition of these peroxides used to manufacture polystyrene and HIPS. The accelerator may be added prior to, during or after the initiator is added to the monomer. The result of this accelerated peroxide decomposition is an increase in polymerization rate and/or a further increase in grafting in HIPS copolymer. However, it is anticipated that the sequential polyperoxide initiators of this invention will accelerate polymerization and/or increase the grafting of the resultant copolymer as compared with an otherwise identical process using a different peroxide initiator, that is, absent a sequential polyperoxide. Such a comparison would be performed in the absence of an accelerator, in one non-limiting embodiment of the invention.

The invention will be further described with respect to a number of specific Examples that are not intended to limit the scope of the invention but are provided to further illustrate it.

Laboratory polymerization studies were conducted utilizing two initiators, LUPERSOL 250 peroxide and LUPERSOL 2531 peroxide, previously mentioned, as well as mixtures of these with LUPERSOL 331 peroxide, a conventionally used peroxide initiator that is not a sequential polyperoxide initiator within the definition of this invention. Comparative reactions were conducted with LUPERSOL 233 peroxide, another initiator currently used in commercial polymerization processes. LUPERSOL 233 peroxide is also not a sequential polyperoxide initiator within the definition of this invention. Table I gives a description of the peroxides studied.

TABLE I

Initiators Used in Styrene Polymerization Studies

| Peroxide | 10 hr T½, ° C. | 1 hr T½, ° C. |
|---|---|---|
| LUPERSOL 250[1] | 111 | 135 |
| LUPERSOL 2531 | 120 | 140 |
| LUPERSOL 233 | 115 | 135 |
| LUPERSOL 331 | 93 | 112 |

[1]Due to expected intramolecular induced decomposition, the half-life data for LUPERSOL 250 may not be strictly meaningful.

In making the preferred compositions of the invention, batch polymerizations are preferably conducted using 97:3 to 91:9 styrene to rubber solutions, in which the obtained styrene conversion to polystyrene is typically in the 60–80% range. The remaining unreacted styrene monomer is removed in a subsequent flashing step under heat and vacuum. In a non-limiting, typical preparation, 3–12% of rubber (e.g., polybutadiene) is dissolved in styrene in the absence or presence of a diluent (e.g., ethylbenzene). A typical polymerization temperature profile to be followed in producing the subject compositions is about 110° C. for 2 hours, about 130° C. for one hour, and about 150° C. for one hour. The polymer is then devolatilized and dried by conventional means (e.g., 0.5 hours at 240° C. under 2 mm Hg). Materials produced as described have a melt flow index (MFI) using ASTM D-1238 Condition G (200° C./5 Kg) of about 2–3 grams/10 minutes. Materials with MFI values of 6–10 can be made by increasing the temperature profile from 130° C. to 180° C. MFI values can be further increased by adding chain transfer agents, such as mercaptans.

As previously noted, the type and functionality of radical species generated upon peroxide decomposition significantly influence polymerization rate and various polymer properties. LUPERSOL 250, a sequential diperoxide initiator, would be expected to yield monofunctional radical species (i.e., methyl and hydroxyl) and, perhaps, an ethyl diradical. Since the hydroperoxy moiety is generally more stable than the t-butylperoxy group, homolytic dissociation would occur at different temperatures. LUPERSOL 2531, a cyclic peroxide, is expected to generate only diradicals, which should result in production of polymers with enhanced molecular weight and low polydispersity.

Polymerization Studies—Crystal Polystyrene

Styrene polymerizations were conducted using a typical temperature ramp profile to assess the effects of initiator type and concentration on rate and molecular weight. FIG. 1 shows the polymer conversion profiles obtained with LUPERSOL 250 and 2531, as well as that of the control, i.e. LUPERSOL 233. At equimolar concentrations (170 ppm LUPERSOL 233, 136 ppm LUPERSOL 250, 150 ppm LUPERSOL 2531), it may be seen that LUPERSOL 233 yields higher conversions, particularly at 130° C., as compared with LUPERSOL 250 and LUPERSOL 2531. However, a concentration of 200 ppm LUPERSOL 250 gives a reasonable conversion profile, relative to LUPERSOL 233. It may thus be concluded that the higher initiator half-lives and, perhaps, intramolecular induced decomposition reactions of LUPERSOL 2531 and LUPERSOL 250, respectively, affect polymerization rates.

Molecular weights for the laboratory-produced crystal polystyrene samples using the various initiators are presented in Table II.

TABLE II

Crystal Polystyrene Molecular Weights

| | | Molecular Weight/1000 | | Polydispersity |
|---|---|---|---|---|
| Ex. | Sample | $M_n$ | $M_w$ | $M_w/M_n$ |
| 1 | 170 ppm L233 | 114.0 | 268.0 | 2.35 |
| 2 | 136 ppm L250 | 98.3 | 261.1 | 2.66 |
| 3 | 200 ppm L250 | 117.3 | 281.3 | 2.40 |
| 4 | 150 ppm L2531 | 126.2 | 303.2 | 2.40 |
| 5 | 200 ppm L2531 | 117.7 | 290.1 | 2.46 |

As seen from the results in Table II, LUPERSOL 250 yields similar molecular weights and polydispersities to those obtained with LUPERSOL 233. LUPERSOL 2531 gives polymers with relatively high molecular weights (particularly $M_w$), however, such results would be expected due to the lower polymerization rates obtained with this initiator—please see FIG. 1.

Polymerization Studies—HIPS

Laboratory HIPS materials were prepared using LUPERSOL 2531 and LUPERSOL 250, as well as mixtures of LUPERSOL 250 together with LUPERSOL 331, a bifunctional peroxyketal. The objective was to assess the effects of initiator type and concentration on polymerization rate, molecular weight and rubber chemistry (i.e. grafting, gels, swell index). The conversion profiles as a function of reaction time for LUPERSOL 2531 using 7% Diene 55 are shown in FIG. 2. Diene 55 is an alkyl lithium polymerized polybutadiene of Firestone Synthetic Rubber & Latex Co. It is seen that the polymer conversions, particularly at 130° C.

(2–3 hr), are significantly lower with LUPERSOL 2531 as compared with LUPERSOL 233, indicating a rather slow peroxide decomposition. Compare Examples 7–9 with Example 6. When the reaction temperature was increased to 150° C. (3–4 hr), the rates increased significantly. In any event, the polymerization profiles obtained with LUPERSOL 2531 would be expected to be of limited use.

FIGS. 3–4 show the polymer conversion profiles obtained with LUPERSOL 250 and mixtures with LUPERSOL 331. It may be seen that the conversions are lower with LUPERSOL 250 alone than with LUPERSOL 233, particularly in the 2–3 hr (130° C.) time frame. When the reaction temperature was increased to 150° C. (3–4 hr), the rates increased significantly. Thus, in an effort to increase conversion in the early polymerization states 50–75 ppm of a lower half-life conventional initiator, LUPERSOL 331 was added. It should be noted that although batch polymerizations are used to describe the invention, the reactions described can be carried out in continuous units, as the one described by Sosa and Nichols in U.S. Pat. No. 4,777,210, incorporated by reference herein.

As seen in FIGS. 3 and 4, the mixed initiator system of 200 ppm LUPERSOL 250 plus 75 ppm LUPERSOL 331 yielded reasonable conversion profiles, relative to the control (Ex. 6; 170 ppm LUPERSOL 233). Table III presents the properties of the laboratory-produced HIPS materials.

chemistry results are apparently due to the presence of the hydroperoxide moiety that yields a high energy hydroxyl radical upon decomposition.

It may thus be concluded that:

LUPERSOL 2531, a developmental cyclic peroxide, yields relatively low polymerization rates and low grafting values, and is thus of relatively low value in these applications.

LUPERSOL 250, a developmental sequential polyperoxide, yields desirable polymerization rates (particularly in combination with conventional initiator LUPERSOL 331) and high (improved) grafting and gel values in HIPS materials.

In the foregoing specification, the invention has been described with reference to specific embodiments thereof, and has been demonstrated as effective in providing methods for preparing polymers using certain new peroxide initiators. However, it will be evident that various modifications and changes can be made thereto without departing from the broader spirit or scope of the invention as set forth in the appended claims. Accordingly, the specification is to be regarded in an illustrative rather than a restrictive sense. For example, specific combinations or amounts of vinylaromatic monomers, diene co-monomers, peroxide initiators, sequential polyperoxide initiators, and other components falling within the claimed parameters, but not specifically identified

TABLE III

Properties of Laboratory-Produced HIPS Materials

| Ex. | [I], ppm/ Type | Mol. Wt./ Mn | 1000 Mw | Disp. | % Grafting | % Gel | SI | RPS, μ |
| --- | --- | --- | --- | --- | --- | --- | --- | --- |
| 7% Diene 55 | | | | | | | | |
| 6 | 170/L233 | 109.5 | 248.0 | 2.3 | 164 | 22.7 | 10.3 | 2.0 |
| 7 | 150/L2531 | 118.3 | 274.9 | 2.3 | 115 | 24.7 | 9.8 | 2.1 |
| 8 | 200/L2531 | 113.0 | 273.8 | 2.4 | 128 | 28.5 | 8.1 | 1.9 |
| 9 | 250/L2531 | 105.6 | 269.1 | 2.5 | 102 | 28.5 | 91 | 1.5 |
| 10 | 200/L250 | 95.4 | 247.9 | 2.6 | 201 | 29.0 | 8.1 | 2.4 |
| 11 | 250/L250 | 97.1 | 238.0 | 2.5 | 214 | 25.8 | 10.6 | 2.5 |
| 12 | 200/L250 + 50/L331 | 86.0 | 239.5 | 2.8 | 228 | 27.3 | 9.6 | 2.6 |
| 13 | 200/L250 + 75/L331 | 98.4 | 252.7 | 2.6 | 239 | 29.5 | 8.5 | 2.1 |
| 7% Taktene 1202 | | | | | | | | |
| 14 | 170/L233 | 74.8 | 232.8 | 3.1 | 135 | 15.4 | 12.9 | 1.8 |
| 15 | 200/L250 + 75/L331 | 81.5 | 222.0 | 2.7 | 181 | 20.1 | 10.9 | 1.9 |

Taktene 1202 is a cobalt catalyst-polymerized polybutadiene from Bayer.

The major points from Table III may be summarized as follows:

LUPERSOL 2531 yields HIPS materials with relatively high molecular weights (due at least partially to decreased polymerization rates) and low grafting values (100–130%). Further, rubber particle size decreases somewhat with increasing LUPERSOL 2531 concentration.

LUPERSOL 250, alone or in combination with LUPERSOL 331, yields HIPS materials with desirable molecular weights and significantly improved (i.e., high) grafting values (200–240% with Diene 55, 180% with Taktene 1202 [high cis]). In general, desirably higher gel levels (allowing for improved rubber utilization and good impact strength performance) and lower swell indices are also obtained with LUPERSOL 250. Without wishing to be bound by any one theory, these rubber or tried in a particular polymer system, are anticipated and expected to be within the scope of this invention. Further, the methods of the invention are expected to work at other conditions, particularly temperature, pressure and proportion conditions, than those exemplified herein.

We claim:

1. A method for producing a polymerized product comprising:

(a) polymerizing at least one vinylaromatic monomer in the presence of a sequential polyperoxide initiator; and (b) recovering a polymerized product.

2. The method of claim 1 where in polymerizing the monomer, the vinylaromatic monomer is styrene.

3. The method of claim 1 where in polymerizing the monomer, the sequential polyperoxide initiator has the structure:

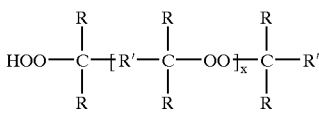

where R is the same or different, linear or branched $C_1$–$C_4$ alkyl, R' is the same or different, linear or branched $C_1$–$C_4$ alkylene, and x ranges from 1 to 4.

4. The method of claim 3 where in polymerizing the monomer, the sequential polyperoxide initiator is a diperoxide and x is 1.

5. The method of claim 1 where in polymerizing the monomer, the sequential polyperoxide initiator is selected from the group consisting of 2,5-dimethyl-2-t-butylperoxy-5-hydroperoxyhexane; HOO—C(CH$_3$)(C$_2$H$_5$)—OO—C(CH$_3$)(C$_2$H$_5$)—OOH, and combinations thereof.

6. The method of claim 1 where in polymerizing the monomer is conducted in the additional presence of a peroxide initiator different from the sequential polyperoxide initiator.

7. The method of claim 1 where in polymerizing the monomer, the sequential polyperoxide initiator is present in an amount ranging from about 50 to about 800 ppm, based on the vinylaromatic monomer feed.

8. The method of claim 1 where in polymerizing the monomer, the polymerizing is conducted at a temperature between about 100° C. and about 180° C.

9. The method of claim 1 where in polymerizing the monomer, the amount of sequential polyperoxide initiator is effective to increase the polymerization rate of the monomer as compared with an otherwise identical method using a different peroxide initiator.

10. The method of claim 1 where in polymerizing the monomer, the polymerization is conducted in the presence of at least one diene polymer or copolymer and the amount of sequential polyperoxide initiator is effective to increase the grafting of the resultant co-polymer as compared with an otherwise identical method using a different peroxide initiator.

11. The method of claim 10 where the weight ratio of vinylaromatic monomer to diene polymer ranges from about 97:3 to about 85:15.

12. The method of claim 10 where in recovering the product, the polymerized product is high impact polystyrene (HIPS).

13. A vinylaromatic monomer resin comprising at least one vinylaromatic monomer and at least one sequential polyperoxide initiator, where the amount of sequential polyperoxide initiator is effective to accelerate the rate of polymerization, to increase the grafting of the resultant polymer or both, as compared with an otherwise identical method using a different peroxide initiator.

14. The vinylaromatic monomer resin of claim 13 where the vinylaromatic monomer is styrene.

15. The vinylaromatic monomer resin of claim 13 where the sequential polyperoxide initiator has the structure:

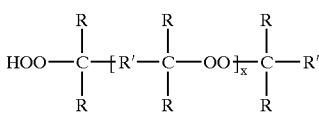

where R is the same or different, linear or branched $C_1$–$C_4$ alkyl, R' is the same or different, linear or branched $C_1$–$C_4$ alkylene, and x ranges from 1 to 4.

16. The vinylaromatic monomer resin of claim 15 where the sequential polyperoxide initiator is a diperoxide and x is 1.

17. The vinylaromatic monomer resin of claim 13 where the sequential polyperoxide initiator is selected from the group consisting of 2,5-dimethyl-2-t-butylperoxy-5-hydroperoxyhexane; HOO—C(CH$_3$)(C$_2$H$_5$)—OO—C(CH$_3$)(C$_2$H$_5$)—OOH, and combinations thereof.

18. The vinylaromatic monomer resin of claim 13 further comprising a peroxide initiator different from the sequential polyperoxide initiator.

19. The vinylaromatic monomer resin of claim 13 where the sequential polyperoxide initiator is present in an amount ranging from about 50 to about 800 ppm, based on the vinylaromatic monomer feed.

20. The vinylaromatic monomer resin of claim 13 where the amount of sequential polyperoxide initiator is effective to increase the rate of polymerization of the vinylaromatic monomer as compared with an otherwise identical method using a different peroxide initiator.

21. The vinylaromatic monomer resin of claim 13 further comprising at least one diene polymer or copolymer, where the amount of sequential polyperoxide initiator is effective to increase the grafting of the resultant co-polymer as compared with an otherwise identical method using a different peroxide initiator.

22. The vinylaromatic monomer resin of claim 21 where the weight ratio of vinylaromatic polymer to diene polymer or copolymer ranges from about 97:3 to about 85:15.

23. A vinylaromatic/diene copolymer made by the method comprising:
(a) copolymerizing at least one vinylaromatic monomer and at least one diene polymer or copolymer in the presence of a sequential polyperoxide initiator; and
(b) recovering a polymerized product having higher grafting as compared with a vinylaromatic/diene copolymer otherwise identical except made in the absence of a sequential polyperoxide initiator.

24. The copolymer of claim 23 where in copolymerizing the vinylaromatic monomer with the diene polymer or copolymer, the vinylaromatic monomer is styrene and the diene polymer is polybutadiene.

25. The copolymer of claim 23 where in copolymerizing the vinylaromatic monomer with the diene polymer or copolymer, the sequential polyperoxide initiator has the structure:

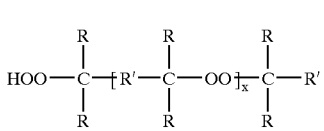

where R is the same or different, linear or branched $C_1$–$C_4$ alkyl, R' is the same or different, linear or branched $C_1$–$C_4$ alkylene, and x ranges from 1 to 4.

26. The copolymer of claim 25 where the sequential polyperoxide initiator is a diperoxide and x is 1.

27. The copolymer of claim 23 where the sequential polyperoxide initiator is selected from the group consisting of 2,5-dimethyl-2-t-butylperoxy-5-hydroperoxy-hexane; HOO—C(CH$_3$)(C$_2$H$_5$)—OO—C(CH$_3$)(C$_2$H$_5$)—OOH, and combinations thereof.

28. The copolymer of claim 23 where in copolymerizing the vinylaromatic monomer with the diene polymer or copolymer, a peroxide initiator different from the sequential polyperoxide initiator is additionally present.

29. The copolymer of claim 23 where the sequential polyperoxide initiator present in an amount ranging from about 50 to about 800 ppm, based on the vinylaromatic monomer.

30. The copolymer of claim 23 where in the copolymerizing, the copolymerizing is conducted at a temperature between about 100° C. and about 180° C.

31. The copolymer of claim 23 where in the copolymerizing, the amount of sequential polyperoxide initiator is effective to increase the grafting of the resultant co-polymer as compared with an otherwise identical method using a different peroxide initiator.

32. The copolymer of claim 31 where the weight ratio of vinylaromatic monomer to diene polymer ranges from about 97:3 to about 85:15.

33. The copolymer of claim 23 where in recovering the product, the polymerized product is high impact polystyrene (HIPS).

* * * * *